Patented Jan. 19, 1926.

1,570,443

UNITED STATES PATENT OFFICE.

EMMA ROSE McSORLEY, OF WOODHAVEN, NEW YORK

FOOD PRODUCT.

No Drawing.   Application filed March 6, 1925. Serial No. 13,457.

*To all whom it may concern:*

Be it known that I, EMMA ROSE McSORLEY, a citizen of the United States, residing at Woodhaven, county of Queens, and State of New York, have invented a certain new and useful Food Product, of which the following is a specification.

This invention relates to food products and is more particularly directed to a new and useful dough for use in making long or short macaroni and noodles.

The objects of the invention are—

First—the production of a dough to be used in the making of macaroni or noodles and which, while being particularly adapted for this use, will contain a relatively large amount of protein and a relatively small amount of starch in contradistinction to ordinary macaroni or noodle dough which contains a relatively large percentage of starch;

Second—the production of a dough containing a more digestible type of protein with a large vitamin content; and, Third—a food which will keep for long periods and will not breed weevils so commonly found in the well known product.

Speaking generally, the dough of the present invention consists in a mixture of ground, dried soy beans, durum whole wheat flour, eggs, lime water and sublimed sulphur.

In preparing the soy beans for use in the dough, said beans are first boiled in moderately salted water for about five or ten minutes after which they are dried and when dried are ground into a relatively fine flour.

After the soy bean flour has been prepared in the manner described, the dough is compounded in approximately the following proportions: soy bean flour, 50 lbs.; whole wheat durum flour, 50 lbs.; whole eggs, 100; sublimed sulphur (U. S. P.), 1 dram (apothecary weight); lime water (5% solution), sufficient to form a dough of the desired consistency.

It will of course be understood that the foregoing proportions may be varied within reasonable limits without departing from the invention, but the formula given has proven thoroughly satisfactory in practice.

The foregoing ingredients are mixed in an ordinary kettle or macaroni mixing machine and are kneaded in the usual way in any suitable dough kneader. The finished dough may be thereupon passed through any suitable macaroni or noodle forming machine and cut and dried in the usual manner.

Macaroni or noodles made from the dough of this invention are highly palatable and are more easily and thoroughly digested than the macaroni or noodles now found on the market. Practically all the doughs heretofore used in the manufacture of noodles or macaroni contain a high percentage of wheat flour which because of its high starch content is hard to digest and constitutes an unbalanced diet. In accordance with the present invention, in contradistinction, the utilization of soy beans in place of a large percentage of the wheat flour eliminates from the noodles the high percentage of starch content and introduces in its place an appreciable percentage of valuable proteins.

The utilization of lime water in place of the ordinary water usually employed renders the food somewhat alkaline in character and precludes the acid stomach effect which is apt to result from heavy eating.

The use of sublimed sulphur serves a dual purpose of not only rendering the food immune to weevils, but also supplying to the human system this beneficial element.

The eggs, aside from their food value, serve as a binder for the other constituents and make the resulting products firm and durable.

The foregoing detailed description sets forth the invention in its preferred practical form, but the invention is to be understood as commensurate with the appended claims.

Having thus fully described the invention, what I claim as new and desire to secure by Letters Patent is:

1. A food composition for macaroni and noodles comprising soy bean flour, wheat flour, eggs, sulphur, and an alkali.

2. A food composition for macaroni and noodles comprising the following constituents in approximately the proportions given; viz, 50 lbs. pulverized, cooked and dried soy beans, 50 lbs. durum whole wheat flour, 100 eggs, 1 dram sublimed sulphur, and a sufficient quantity of a 5% solution of lime water to impart the desired consistency.

In testimony whereof I have signed the foregoing specification.

EMMA ROSE McSORLEY.